United States Patent
Takanashi

(10) Patent No.: US 6,725,977 B2
(45) Date of Patent: Apr. 27, 2004

(54) WEAR-DETECTING PROBE AND A BRAKING ELEMENT PROVIDED THEREWITH

(75) Inventor: Hitoshi Takanashi, Yokkaichi (JP)

(73) Assignee: Sumitomo Wiring Systems, Ltd. (JP)

(*) Notice: Subject to any disclaimer, the term of this patent is extended or adjusted under 35 U.S.C. 154(b) by 0 days.

(21) Appl. No.: 10/193,492

(22) Filed: Jul. 10, 2002

(65) Prior Publication Data

US 2003/0085081 A1 May 8, 2003

(30) Foreign Application Priority Data

Nov. 7, 2001 (JP) ........................... 2001-210599

(51) Int. Cl.[7] .............................................. F16D 66/00
(52) U.S. Cl. .................................................. 188/1.11 L
(58) Field of Search ........................... 73/7, 129, 866.5; 340/454; 188/1.11 W, 1.11 L, 1.11 E

(56) References Cited

U.S. PATENT DOCUMENTS 3,297,985 A * 1/1967 Trebonsky et al. ......... 340/454
4,932,247 A * 6/1990 Gorres ........................ 73/129

FOREIGN PATENT DOCUMENTS

| GB | 2194824 A | * | 3/1988 | ............ F16D/66/02 |
| JP | 05133866 A | * | 5/1993 | ............ G01N/3/56 |

* cited by examiner

*Primary Examiner*—Jack Lavinder
*Assistant Examiner*—Xuan Lan Nguyen
(74) *Attorney, Agent, or Firm*—Gerald E. Hespos; Anthony J. Casella

(57) ABSTRACT

A probe (20) has a holder (21) with a small-diameter portion (25) and a stepped surface (33) at a base end of the small diameter portion (25). The stepped surface (33) is recessed over the entire circumference of a base end of a small-diameter portion (25) to form a groove (40) and an inner corner of the groove (40) is rounded. The probe (20) is mounted by resiliently pressing the stepped surface (33) against the edge of a mount hole (15) in a base plate (13) of a brake shoe (12). A bending force acts on the small-diameter portion (25) of the holder (21) due to the sliding contact of the brake drum (10). However, the rounded portion (41) at the bottom of the groove (40) avoids a stress concentration on an inner corner of the base end of the small diameter portion (25).

7 Claims, 4 Drawing Sheets

WEAR-DETECTING PROBE AND A BRAKING ELEMENT PROVIDED THEREWITH

BACKGROUND OF THE INVENTION

1. Field of the Invention

The present invention relates to a wear-detecting probe for a braking element and to a braking element provided therewith.

2. Description of the Related Art

A known wear-detecting probe is identified by the numeral 1 in FIG. 4. The probe 1 has a stepped holder 2 with a leading end and a narrow section 2A adjacent the leading end. A wire 3 is folded in U-shape and held in the holder 2 with the fold of the wire 3 exposed from the leading end of the holder 2. The probe 1 is used with a brake shoe 4 that has a base plate 5 with a mount hole 6 and a friction member 7 mounted on the base plate 5. The narrow section 2A of the holder 2 is introduced through the mount hole 6 and projects into the friction member 7. A clip 8 is used to press a stepped surface 9 of the holder 2 resiliently against the edge of the mount hole 6. The friction member 7 is abraded by a mating rotary element during normal use, and a specified amount of abrasion will cut the folded section of the wire 3.

The mating rotary element that contacts the folded section of the wire 3 exerts a bending force on the narrow section 2A of the holder 2, as shown by an arrow in FIG. 4. This bending force may concentrate a stress on a corner 9A at the base end of the narrow section 2A to crack or break the holder 2 at the corner 9A. The concentration of the stress can be alleviated if the corner 9A is rounded. However, the stepped surface 9 of the holder 2 determines the projected amount of the holder 2 by being properly brought into contact with the edge of the mount hole 6. Thus, if the corner 9A of the narrow section 2A is rounded, the stepped surface 9 cannot be brought precisely into contact with the edge of the mount hole 6. Accordingly, the corner 9A should remain a right-angle, and the above problem cannot be dealt with easily.

The present invention was developed in view of the above problem and an object thereof is to avoid the concentration of a stress while maintaining a mounting precision of a holder.

SUMMARY OF THE INVENTION

The invention is directed to a wear-detecting probe to be assembled or mounted with a braking element that can contact a rotary element. The probe is adapted to detect whether a degree of abrasion of the braking element has reached a wear limit based on whether a detection wire has been cut or abraded. The wear-detecting probe comprises a stepped holder with a leading end and a narrow section at the leading end. A wire is arranged in the holder and is exposed from the leading end of the holder. The holder is insertable into a mount hole in the braking element so that a stepped surface of the holder substantially contacts an edge of the mount hole. The stepped surface of the holder is recessed over substantially the entire periphery of a base end of the narrow section to form a groove, and a radially inner corner of the bottom of the groove is rounded.

A bending force acts on the small-diameter portion of the holder when the detection wire contacts the mating rotary element and may concentrate a stress on the inner corner of the bottom of the groove. However, the corner or of the groove is rounded, and hence the stress concentration can be avoided. Thus, cracks and the like can be prevented.

The groove is formed around the base end of the narrow section. Thus, the stepped surface can be held properly in contact with the edge of the mount hole while maintaining a flat contact surface. Therefore, the holder can be assembled precisely with the braking piece.

The detection wire preferably is folded substantially in a U-shape and is held in the holder such that a folded section is exposed from the leading end of the holder.

Preferably, the rounded portion is substantially semicircular.

The narrow section preferably is provided at its leading end with a supporting projection to support the folded section of the detection wire in an axial and/or radial direction.

A flange preferably is provided for mounting the wear-detecting probe to the braking element via a biasing means that biases the stepped surface of the wear-detecting probe toward the mount hole.

The wire preferably is exposed toward the leading end by being drawn-out and inserted into corresponding openings in the narrow section.

The invention also is directed to a braking element with a wear-detecting probe as described above. The wear detecting probe is assembled with a braking piece that can contact a rotary element and can detect whether a degree of abrasion of the braking element has reached a working limit based on whether a detection wire has been cut.

The mount hole preferably is in a base plate of the braking element.

A biasing means may be provided for biasing the stepped surface of the wear-detecting probe toward the mount hole. The biasing means may be mountable on the wear-detecting probe via a mount member.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
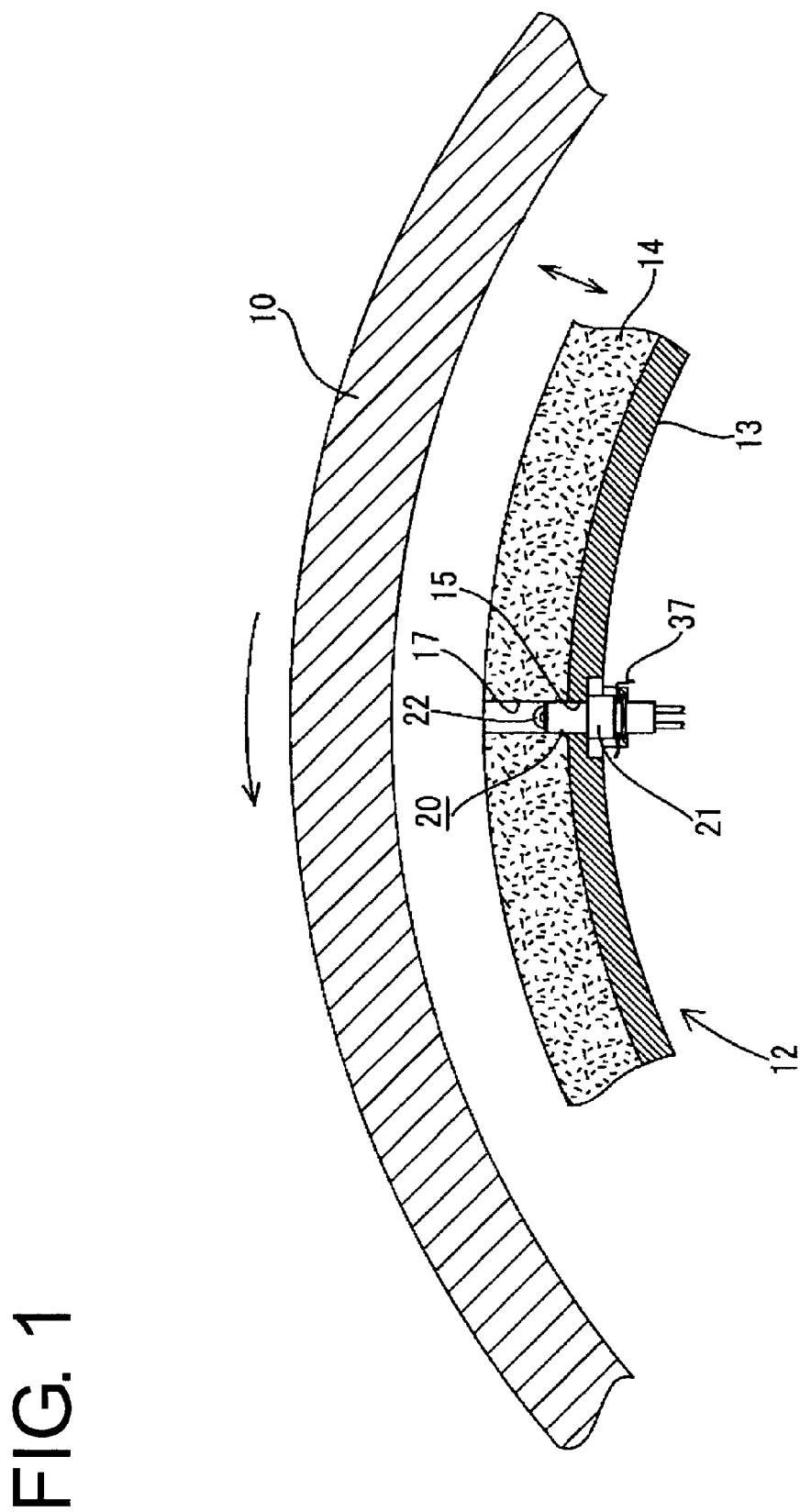
FIG. 1 is a section showing an assembled state of a wear-detecting probe according to one embodiment of the present invention.
Figure 2:
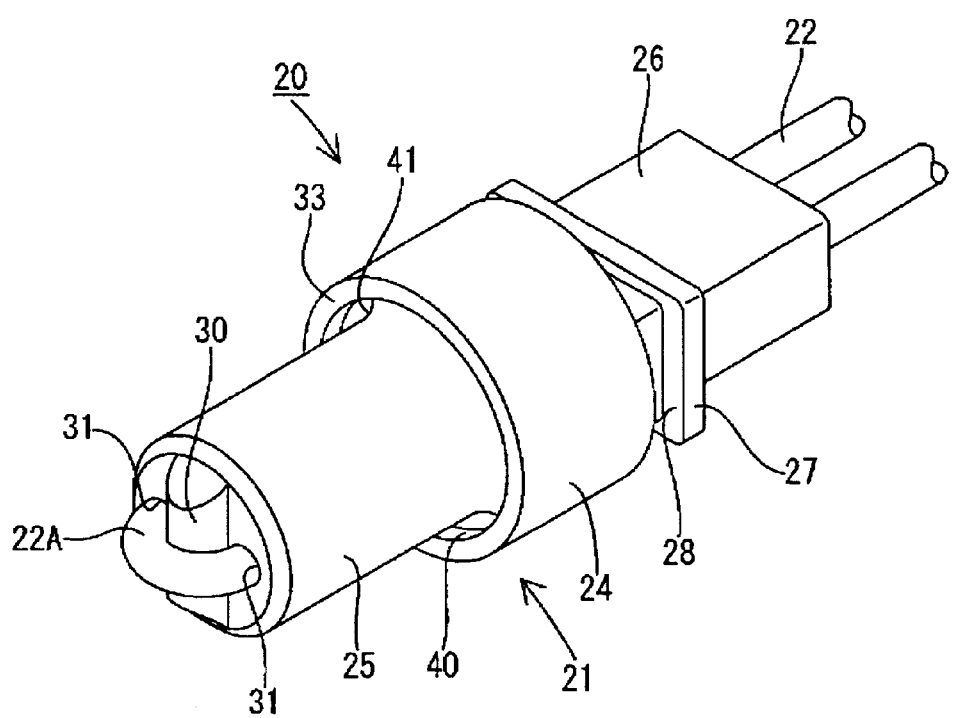
FIG. 2 is a perspective view of a wear-detecting probe.
Figure 3:
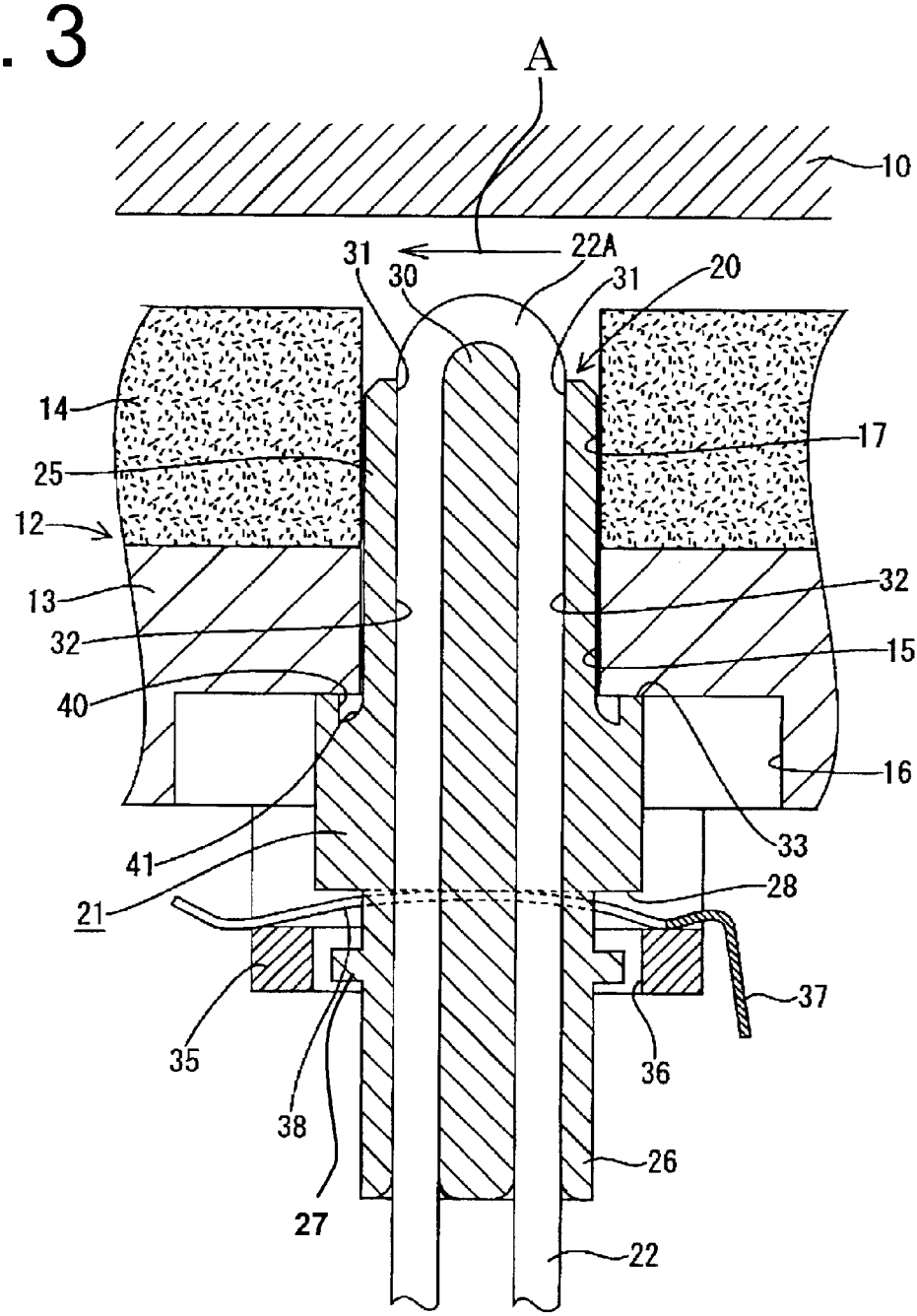
FIG. 3 is a section of a mounting part of the wear-detecting probe.
Figure 4:
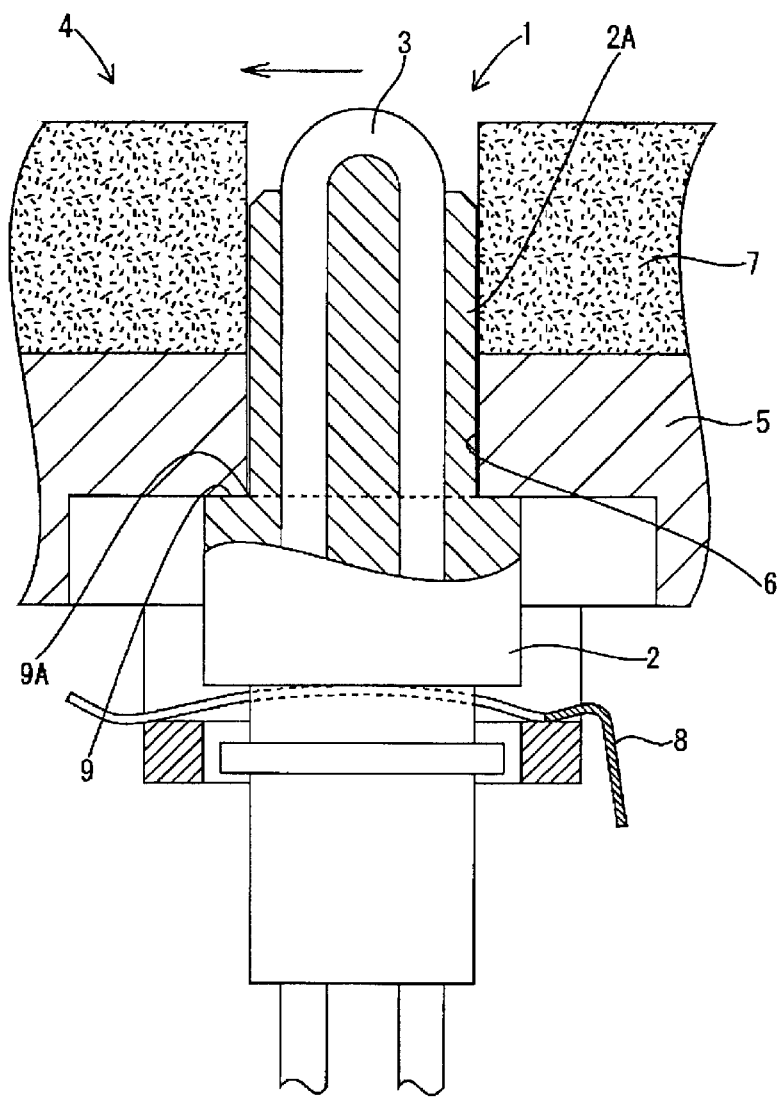
FIG. 4 is a section of a prior art wear-detecting probe.

A preferred embodiment of the invention is described herein with reference to FIGS. 1 to 3, wherein a side of a wear-detecting probe to be contacted with a brake is identified as the forward side or front.

In this embodiment, the invention is applied to a drum brake of an automotive vehicle. The tubular brake drum is identified by the numeral 10 in FIG. 1 and is rotatable together with a wheel. Brake shoes 12 are disposed symmetrically inside the brake drum 10. Each brake shoe 12 each has a base plate 13 and a friction member 14 mounted to the outer surface of the base plate 13. Braking is applied by spacing the brake shoes 12 wider apart with an unillustrated hydraulically operating device for pressing the brake shoes 12 against the inner surface of the brake drum 10.

A mount hole 15 is formed in the base plate 13 of each brake shoe 12, and a wear-detecting probe 20 is mounted in the mount hole 15.

The wear-detecting probe 20 has a holder 21 made e.g. of a synthetic resin and detection wire 22 is held in the holder 21. As shown in FIGS. 2 and 3, the holder 21 has a stepped cylindrical main body 24 with a small-diameter portion 25 at its leading side, and a substantially rectangular mounting portion 26 on the rear of the main body 24. A flange 27 is formed on the outer periphery of the mounting portion 26 at a specified distance back from the rear surface of the main body 24, and an insertion groove 28 is formed between the flange 27 and the main body 24 for receiving a metallic spring clip 37.

A supporting projection 30 with a substantially rounded cross section is formed along a diameter at the leading end of the small-diameter portion 25 of the holder 21. Two openings 31 are formed in the leading end surface of the small-diameter portion 25 at opposite sides of the supporting projection 30. Insertion holes 32 through which the wire 22 is inserted extend from the two openings 31 to the rear surface of the mounting portion 26 substantially parallel with a longitudinal axis (see FIG. 3).

One end of the wire 22 is inserted through one insertion hole 32 from the rear of the mounting portion 26 and is drawn out from the corresponding opening 31 at the leading end of the small-diameter portion 25. The wire 22 then is folded in a U-shape, inserted into the other opening 31 and drawn out from the rear surface of the mounting portion 26 through the other insertion hole 32. Thereafter, the wire 22 is pulled strongly so that the inner side of the U-shaped folded section contacts the supporting projection 30.

The small-diameter portion 25 of the holder 21 is inserted through the mount hole 15 in the base plate 13 of the brake shoe 12, as shown in FIG. 3. A wider hole 16 is formed continuously at the inner side (lower side in FIG. 3) of the mount hole 15 opposite to the brake drum 10, and an outer end of the mount hole 15 substantially aligns with and communicates with an introduction hole 17 in the friction member 14.

A mount member 35 formed with an insertion opening 36 is fixed to the inner surface of the base plate 13 and substantially faces the wider hole 16.

The metallic clip 37 is formed by coupling ends of two curved resilient pieces 38.

The probe 20 is inserted into the mount hole 15 through the insertion opening 36 of the mount member 35, and the leading end of the probe 20 is inserted into the introduction hole 17 of the friction member 14. The metallic clip 37 then is inserted through lateral openings of the mount member 35, and the resilient pieces 38 are inserted into the insertion groove 28 to hold the mounting portion 26 of the holder 21. At this stage, the curved resilient pieces 38 are deformed resiliently and are substantially flat between the mount member 35 and the rear surface of the main body 24. A stepped surface 33 of the holder 21 is pressed against the edge of the mount hole 15 by resilient restoring forces of the resilient pieces 38. As a result, the probe 20 is mounted on the base plate 13 of the brake shoe 12.

The folded section 22A of the wire 22 is folded substantially in a rotating direction of the brake drum 10. The opposite ends of the wire 22 drawn out from the rear surface of the mounting portion 26 are connected with an unillustrated wire-cut detector, so that a warning signal, such as a warning lamp, can be activated when the wire 22 is cut.

The stepped surface 33 of the holder 21 is recessed over the entire circumference of the base end of the small-diameter portion 25 to form a groove 40. The inner corner 41 of the bottom of the groove 40 (i.e. the transition between a surface of the groove 40 substantially parallel to the axial direction of the wear-detecting probe 20 and a radial surface of the groove 40) is rounded. The rounded portion 41 has a part-circular cross section and is substantially tangent to the small-diameter portion 25. Moreover, the radially outward corner of the groove 40 also may be rounded in a similar way to the inner rounded portion 41.

The brake shoes 12 are spaced wider apart when a brake pedal is operated and the friction members 14 are pressed against the inner surface of the brake drum 10 as described above, thereby applying braking. Braking is repeated, and the friction members 14 of the brake shoes 12 gradually abrade due to a friction with the brake drum 10. The wear-detection probes 20 in the friction members 14 are exposed gradually as the friction members 14 abrade. The folded sections 22A of the wires 22 supported by the supporting projections 30 also are brought into sliding contact with the inner surface of the brake drum 10 and abrade similar to the friction members 14.

During this time, the brake drum 10 is held in sliding contact with the folded section 22A of the wire 22 and a bending force in the direction of arrow A in FIG. 3 acts on the small-diameter portion 25 of the holder 21. However, the rounded portion 41 at the inner corner of the bottom of the groove 40 avoids the concentration of the stress.

The folded sections 22A of the wires 22 are cut completely when the friction members 14 of the brake shoes 12 are abraded to a working limit position. Then, cut wires 22 are detected by the wire-cut detector and the warning lamp or other signal is activated to notify that the working limit position has been reached.

As described above, the concentration of stress on the inner corner of the bottom of the groove 40 resulting from the bending force on the small-diameter portion 25 of the holder 21 is avoided by the rounded portion 41 at the inner corner or radially inward transitional portion of the bottom of the groove 40. This prevents the small-diameter portion 25 from being cracked or broken.

Further, the groove 40 is formed around the base end of the small-diameter portion 25, and hence the stepped surface 33 can be brought properly into contact with the edge of the mount hole 15. Thus, the probe 20 can be mounted precisely on the brake shoe 12.

The invention is not limited to the above described and illustrated embodiment. For example, the following embodiments also are embraced by the technical scope of the present invention as defined by the claims. Beside the following embodiments, various changes can be made without departing from the scope and spirit of the present invention as defined by the claims.

The means for mounting the probe is not limited to a clip. A torsion spring or any biasing means will do provided that it can mount the probe by resiliently pressing or biasing the stepped surface of the holder against the edge of the mount hole.

The present invention is not limited to drum brakes, and may be applied to a wide range of wear-detecting probes used in braking devices that stop rotation by a friction with another member, such as disk brakes.

What is claimed is:

1. A wear-detecting probe to be assembled withal braking element having a front face for contact with a rotary element, a rear face and a mounting hole extending between the front and rear faces, the wear-detecting probe being adapted to detect whether abrasion of the braking element has reached a working limit based on whether a detection wire has been cut, comprising: a stepped holder having a narrow section with a leading end and a base end, a stepped surface adjacent the base end of the narrow section, the detection wire being arranged in the holder and being exposed at the leading end, the holder being insertable into a the mount hole in the braking element and mounted such that the stepped surface contacts a portion of the rear face of the braking element spaced outwardly from the mount hole, wherein the stepped surface of the holder is recessed over the periphery of the base end of the narrow section to form a groove, and an inner corner of the groove forming a rounded portion, whereby the groove and the rounded portion avoid stress concentration in response to forces exerted on the wear-detecting probe.

2. The wear-detecting probe of claim 1, wherein the wire is inserted while being folded substantially in a U-shape and is held such that a folded section thereof is exposed from the leading end surface of the holder.

3. The wear-detecting probe of claim 2, wherein the folded section is folded in a direction of rotation of the rotary element.

4. The wear-detecting probe of claim 1, wherein the rounded portion is rounded in a substantially part-circular concave manner.

5. The wear-detecting probe, to be assembled with a braking element for contact with a rotary element and adapted to detect whether abrasion of the braking element has reached a working limit based on whether a detection wire has been cut, comprising: a stepped holder having a narrow section with a leading end and a base end, a stepped surface adjacent the base end of the narrow section, the detection wire being arranged in the holder and being exposed at the leading end, the holder being insertable into a mount hole in the braking element and mounted such that the stepped surface contacts an area of the braking element surrounding the mount hole, wherein the step surface of the holder is recessed over the periphery of the base end of the narrow section to form a groove, and an inner corner of the groove forming a rounded portion, the wire being inserted and folded substantially in a U-shape and being held such that a folded section thereof is exposed from the leading end surface of the holder, wherein the leading end of the narrow section has a supporting projection to support the folded section of the wire.

6. The A wear-detecting probe, to be assembled with a braking element for contact with a rotary element and adapted to detect whether abrasion of the braking element has reached a working limit based on whether a detection wire has been cut, comprising: a stepped holder having a narrow section with a leading end and a base end, a stepped surface adjacent the base end of the narrow section, the detection wire being arranged in the holder and being exposed at the leading end, the holder being insertable into a mount hole in the braking element and mounted such that the stepped surface contacts an area of the braking element surrounding the mount hole, wherein the step surface of the holder is recessed over the periphery of the base end of the narrow section to form a groove, and an inner corner of the groove forming a rounded portion, the wire being inserted and folded substantially in a U-shape and being held such that a folded section thereof is exposed from the leading end surface of the holder, wherein the holder comprises a main body adjacent the stepped surface and extending away from the narrow section, an insertion groove being formed adjacent the main body and spaced from the stepped surface for receiving a biasing means for biasing the stepped surface of the wear-detecting probe (20) toward the mount hole.

7. The A wear-detecting probe, to be assembled with a braking element for contact with a rotary element and adapted to detect whether abrasion of the braking element has reached a working limit based on whether a detection wire has been cut, comprising: a stepped holder having a narrow section with a leading end and a base end, a stepped surface adjacent the base end of the narrow section, the detection wire being arranged in the holder and being exposed at the leading end, the holder being insertable into a mount hole in the braking element and mounted such that the stepped surface contacts an area of the braking element surrounding the mount hole, wherein the step surface of the holder is recessed over the periphery of the base end of the narrow section to form a groove, and an inner corner of the groove forming a rounded portion, the wire being inserted and folded substantially in a U-shape and being held such that a folded section thereof is exposed from the leading end surface of the holder, wherein the wire is exposed toward the leading end by being drawn-out and inserted into corresponding openings provided in the narrow section.

\* \* \* \* \*